United States Patent
Shimazu et al.

(10) Patent No.: US 8,821,024 B2
(45) Date of Patent: Sep. 2, 2014

(54) MEMBER FOR ROLLING BEARING AND ROLLING BEARING

(75) Inventors: Eiichirou Shimazu, Mie (JP); Masaki Egami, Mie (JP); Yoshihide Himeno, Mie (JP); Kazutoyo Murakami, Mie (JP)

(73) Assignee: NTN Corporation, Osaka (JP)

( * ) Notice: Subject to any disclaimer, the term of this patent is extended or adjusted under 35 U.S.C. 154(b) by 382 days.

(21) Appl. No.: 12/735,716

(22) PCT Filed: Feb. 20, 2009

(86) PCT No.: PCT/JP2009/053047
§ 371 (c)(1),
(2), (4) Date: Aug. 11, 2010

(87) PCT Pub. No.: WO2009/104743
PCT Pub. Date: Aug. 27, 2009

(65) Prior Publication Data
US 2010/0316315 A1    Dec. 16, 2010

(30) Foreign Application Priority Data

Feb. 22, 2008 (JP) .................................. 2008-041475
Feb. 28, 2008 (JP) .................................. 2008-048587
Jul. 18, 2008 (JP) .................................. 2008-187020

(51) Int. Cl.
*F16C 33/62* (2006.01)

(52) U.S. Cl.
USPC ........................... 384/492; 384/445; 384/576

(58) Field of Classification Search
USPC ........... 384/42, 482, 492, 527, 576, 907–909, 384/307.3; 252/62.51 C; 525/76; 428/292.1, 428/307.3
See application file for complete search history.

(56) References Cited

U.S. PATENT DOCUMENTS 5,575,570 A   11/1996  Uchiyama
6,395,677 B1   5/2002  Hokkirigawa
(Continued)

FOREIGN PATENT DOCUMENTS

EP   1 215 409 A2   6/2002
EP   1757636 A1    2/2007
(Continued)

OTHER PUBLICATIONS

PCT Search Report dated Apr. 7, 2009.
(Continued)

*Primary Examiner* — Marcus Charles
(74) *Attorney, Agent, or Firm* — Hedman & Costigan, P.C.; James V. Costigan; Kathleen A. Costigan

(57) ABSTRACT

The present invention provides a member for a rolling bearing (1) which is capable of decreasing the amount of carbon dioxide generated from a polymeric member in discarding the rolling bearing, contributing to restraint or prevention of an increase in the concentration of the carbon dioxide in the atmosphere or a decrease of the concentration thereof in the atmosphere, and allows a continuous use temperature to be high and an endurance time to be long and a rolling bearing using the member. The member for the rolling bearing (1) is composed of a molding of a polymeric elastic body or a synthetic resin composition. The member is at least one member selected from among an inner ring (2), an outer ring (3), rolling elements (4), a retainer (5), and a sealing member (6). A raw material derived from a biomass is at least partially used for a producing raw material of a polymeric matrix composing the polymeric elastic body or the synthetic resin composition.

10 Claims, 4 Drawing Sheets

(56) References Cited

U.S. PATENT DOCUMENTS

| | | | |
|---|---|---|---|
| 6,517,250 | B1 | 2/2003 | Ohira et al. |
| 6,811,599 | B2 * | 11/2004 | Fischer et al. ............ 525/70 |
| 7,148,281 | B2 * | 12/2006 | Vilkman et al. ............ 524/440 |
| 7,416,780 | B2 * | 8/2008 | Leite et al. ............ 428/307.3 |
| 2006/0121262 | A1 * | 6/2006 | Vecchione et al. ......... 428/292.1 |
| 2006/0249705 | A1 * | 11/2006 | Wang et al. ............ 252/62.51 C |
| 2007/0241306 | A1 * | 10/2007 | Wehner et al. ............ 252/67 |

FOREIGN PATENT DOCUMENTS

| | | | | |
|---|---|---|---|---|
| EP | 2022811 A1 | 11/2009 | | |
| GB | 2407322 A | * 4/2005 | ........... | C08J 5/24 |
| JP | 10-082425 A | 3/1998 | | |
| JP | 2002-187773 A | 7/2002 | | |
| JP | 2002-363391 A | 12/2002 | | |
| JP | 2003-65342 A | 3/2003 | | |
| JP | 2003-336642 A | 11/2003 | | |
| JP | 2004-68913 A | 3/2004 | | |
| JP | 2004-92732 A | 3/2004 | | |
| JP | 2004-92769 A | 3/2004 | | |
| JP | 2005-006650 A | 1/2005 | | |
| JP | 2005-29752 A | 2/2005 | | |
| JP | 2006-016643 A | 1/2006 | | |
| JP | 2006-348057 A | 12/2006 | | |
| JP | 3993377 | 8/2007 | | |
| JP | 2007-315483 A | 12/2007 | | |
| JP | 2007-320988 A | 12/2007 | | |
| WO | 2007/132733 A1 | 11/2007 | | |

OTHER PUBLICATIONS

Communication pursuant to Article 94(3), European Patent Office in corresponding EP application dated .Sep. 19, 2013.
Supplementary European Search Report Apr. 27. 2012.

* cited by examiner

MEMBER FOR ROLLING BEARING AND ROLLING BEARING

TECHNICAL FIELD

The present invention relates to a member for a rolling bearing and the rolling bearing and more particularly to a member for a rolling bearing, composed of a molding of a synthetic resin composition, containing a polymer as the matrix thereof, which is obtained by synthesizing a raw material derived from a biomass and a rolling bearing in which the member for the rolling bearing is used.

BACKGROUND ART

Of members constructing the rolling bearing, a retainer and a sealing member are often constructed as a molding of a synthetic resin composition or a polymeric elastic body. Engineering plastics and synthetic rubber derived from fossil resources have been adopted for the synthetic resin composition and the polymeric elastic body.

For fear that biological environment is harmed when a used rolling bearing is disposed of as industrial waste, a retainer made of synthetic resin having biodegradability, a sealing member made of resin, and grease-applied rolling bearing are proposed (patent documents 1 and 2).

But even though the synthetic resin composition having biodegradability is used, the polymeric matrix is eventually a source of carbon dioxide emissions owing to biodegradation or combustion when the polymeric matrix composing the synthetic resin composition is plastic or the like derived from the fossil resource. Thus the polymeric matrix has a problem that it gives an adverse effect on global warming Because the bearing in which the molding of the synthetic resin composition is used as the retainer and the sealing member has a high degree of design and a high productivity and contributes to a decrease in the weight of the bearing, there is a growing demand for expanding areas of use of such a bearing in recent years. But the bearing having its members made of the synthetic resin has a problem that the synthetic resin gradually deteriorates because of use at a high temperature for a long time unlike a bearing totally made of metal, which makes it impossible to make the continuous use temperature high and the endurance time long.

The molding made of the synthetic resin composition containing a raw material derived from the biomass has a problem described below, although the raw material derived from the biomass is capable of decreasing the amount of carbon dioxide generated from a time when the molding of the synthetic resin composition is produced until it is discarded and contributing to restraint and prevention of an increase in the concentration of the carbon dioxide in the atmosphere or a decrease of the concentration thereof: Because the polymer has amide bonds and ester bonds inside it, the polymer becomes low-molecular owing to hydrolysis of the amide bonds and the ester bonds caused by an atmosphere gas and thus the mechanical strength thereof gradually deteriorates. Therefore there is a demand for the development of a measure for preventing the deterioration of a polymeric material for the bearing.

Patent document 1: U.S. Pat. No. 3,993,377
Patent document 2: Japanese Patent Application Laid-Open No. 2004-68913

DISCLOSURE OF THE INVENTION

Problem to be Solved by the Invention

The present invention has been made to cope with the above-described problems. It is an object of the present invention to provide a member for a rolling bearing which is capable of decreasing the amount of carbon dioxide generated from a polymeric member in discarding the rolling bearing, contributing to restraint or prevention of an increase in the concentration of the carbon dioxide in the atmosphere or a decrease of the concentration thereof in the atmosphere, and allows a continuous use temperature to be high and an endurance time to be long and a rolling bearing using the member.

Means for Solving the Problem

The member for a rolling bearing of the present invention composed of a molding of a polymeric elastic body or a synthetic resin composition. The member for the rolling bearing is at least one member selected from among an inner ring, an outer ring, a rolling element, a retainer, and a sealing member. A raw material derived from a biomass is at least partially used for a producing raw material of a polymeric matrix composing the polymeric elastic body or the synthetic resin composition. The member for the rolling bearing is the retainer.

At least a fibrous filler is added to the polymeric matrix. A surface layer is formed on a part of a surface of a molding obtained by molding the polymeric elastic body or the synthetic resin composition. The above-described part of the surface is exposed to an atmosphere in which the member for the rolling bearing is used. The surface layer is composed of a material different from that of the polymeric elastic body or that of the synthetic resin composition and has a lower transmission rate than the polymeric elastic body or the synthetic resin composition for an atmospheric component.

The polymeric matrix contains at least radiocarbon 14 ($^{14}C$).

The polymeric matrix is at least one selected from polyamides, polyesters, and cellulose derivatives. The polymeric matrix is at least one selected from polyamide 11, polyamide 6-10, polyamide 66, polytrimethylene terephthalate, polybutylene terephthalate, cellulose acetate, cellulose acetate propionate, and cellulose acetate butyrate.

When the polymeric matrix contains the fibrous filler, the polymeric matrix is at least one selected from polyamides and polyesters. The polymeric matrix is at least one selected from polyamide 11, polyamide 66, polyamide 6-10, polytrimethylene terephthalate, and polybutylene terephthalate.

The fibrous filler is fiber having an aspect ratio of not less than 5. The fiber having the aspect ratio of not less than 5 is glass fiber and/or carbon fiber.

The atmosphere in which the member for the rolling bearing of the present invention is used contains at least one component selected from among oxygen, ozone, and water vapor. There is formed the surface layer having a lower transmission rate than the polymeric elastic body or the synthetic resin composition composing the member for rolling bearing for the atmospheric component containing these components. To form the surface layer having a low transmission rate for the atmospheric component means the formation of a gas barrier layer on the surface of the member for the rolling bearing composed of the raw material derived from the biomass.

The gas barrier layer is at least one surface layer selected from among a polymeric compound layer, a ceramic layer, and a metal layer. An activation energy of deterioration of a member (member A) for the rolling bearing on which the surface layer is formed is almost equal to that of a member (member B) for the rolling bearing on which the surface layer is not formed; and a durability temperature of the member A is higher than that of the member B at a predetermined life characteristic value.

The rolling bearing of the present invention has an inner ring having a rolling surface on a peripheral surface thereof, an outer ring having a rolling surface on an inner peripheral surface, a plurality of rolling elements disposed between the both rolling surfaces, a retainer holding the plurality of rolling elements, and a sealing member. At least one member selected from among the inner ring, the outer ring, the rolling elements, the retainer, and the sealing member is the molding of the polymeric elastic body or the synthetic resin composition containing the polymer obtained by using the producing raw material in which the raw material derived from the biomass is contained at least partially as the main matrix thereof.

Effect of the Invention

In the member for the rolling bearing of the present invention, the polymer (hereinafter referred to as bioplastics) obtained by synthesizing the producing raw material in which the raw material derived from the biomass is contained at least partially is used as the main matrix thereof. Therefore as compared with the case in which the polymer derived from the fossil resource is used, the present invention is capable of providing the rolling bearing having the retainer and/or the seal which do not substantially emit carbon dioxide or are capable of restraining the carbon dioxide emission in the process of discarding and recycling the rolling bearing and apply a low extent of environmental load.

Because the member for the rolling bearing of the present invention contains the fibrous filler consisting of fibers having the aspect ratio of not less than 5, the member for the rolling bearing has a strength, an elastic modulus, a dimensional precision, and dimensional stability demanded for the retainer or the seal.

In the member for the rolling bearing of the present invention, the gas barrier layer is formed on the surface of the bioplastics. Therefore the gas barrier effectively prevents a gas such as oxygen and water vapor which induces hydrolysis of the amide bond and the ester bond contained in the bioplastics from contacting the bioplastics and thus allows a continuous use to be achieved at a high temperature.

Figure 1:
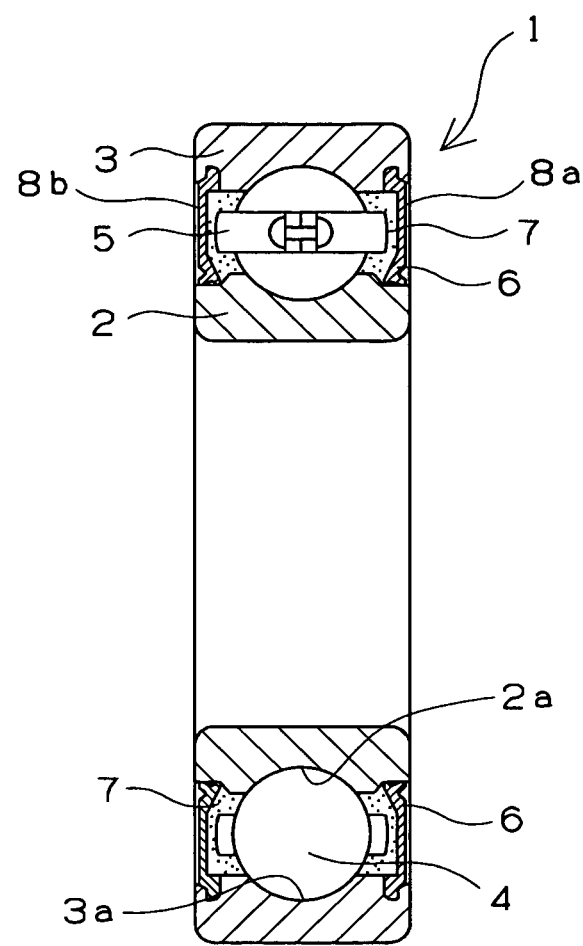
FIG. 1 is a sectional view of a grease-enclosed deep groove ball bearing (not provided with a core of a sealing member).

EXPLANATION OF REFERENCE SYMBOLS AND NUMERALS 1, 11: deep groove ball bearing
2, 12: inner ring
3, 13: outer ring
4, 14: rolling element
5, 15: retainer
6, 16: sealing member
7, 17: grease
8a, 8b, 18a, 18b: openings disposed in axial direction

BEST MODE FOR CARRYING OUT THE INVENTION

As defined in Biomass Nippon Strategy formulated by the Ministry of Agriculture, Forestry, and Fisheries on Mar. 31, 2007, in the present invention, the biomass means organic resources derived from renewable organisms or plants except fossil resources. The biomass includes discarded paper, animal excrement, food waste, timber generated from construction, formulating plant residue, black liquor (pulp mill waste), sewage sludge, human waste sludge, rice straw, straw, chaff, logging residues (thinned wood, damaged timber, and the like), forage crop, starch-based crops, shells of crustaceans such as crab, shrimp, and the like.

A member for a rolling bearing of the present invention is produced from a molding of a synthetic resin composition or a polymeric elastic body both obtained from a polymeric matrix obtained by using a producing raw material in which a raw material derived from the biomass is contained at least partially.

The polymeric matrix is a polymer obtained by synthesizing the producing raw material in which the raw material derived from the biomass is contained at least partially. The raw material is extracted and denatured from plants which have grown by absorbing carbon dioxide in the atmosphere and organisms which have ingested the plants to obtain a polymeric material through a polymerization process. Therefore the polymeric material has a characteristic called carbon neutral (neutral for carbon cycle and unharmful) that the polymeric material does not contribute to an increase of a carbon dioxide concentration in the atmosphere when the rolling bearing is discarded by combustion or biodegraded at a waste time or is capable of decreasing carbon dioxide emission unlike polymers obtained by synthesizing conventional fossil-based raw materials.

Because inner and outer rings of most rolling bearings are made of bearing steel which is a metal, the rolling bearings are recycled as iron in discarding them. A polymeric member contained in the bearing is frequently burnt and disposed of as carbon dioxide in a recycling process. That is, the same amount of the carbon dioxide as a fossil resource used as the raw material of the polymeric member increases.

When attention is paid to the carbon element of the polymeric matrix used for the member for the rolling bearing, the carbon element can be classified into the one derived from the fossil resource and the one derived from the biomass. The ratio of the carbon element derived from the biomass to all carbon elements composing the polymeric matrix can be calculated as a biomass carbon content rate (hereinafter referred to as bio-carbon degree) by using an equation (1).

Bio-carbon degree(%)=(Number of carbon elements derived from biomass/Number of all carbon elements composing polymeric matrix)×100     (1)

The polymeric matrix to be used in the present invention does not have a problem when the bio-carbon degree exceeds 0%. To enhance the effect of decreasing the amount of the carbon dioxide emission at a burning time, it is preferable that the bio-carbon degree is not less than 15%. The higher the bio-carbon degree is, the better.

Whether the polymeric matrix is composed of the raw material derived from the biomass can be determined by examining whether radiocarbon 14 (hereinafter may be referred to as $^{14}$C) to be contained in the polymeric matrix is present. Because the half-life of the $^{14}$C is 5730 years, the $^{14}$C is not contained in carbon derived from the fossil resource which is generated after not less than ten million years elapse. From this, when the polymeric member contains the $^{14}$C, it can be determined that the raw material derived from the biomass is used for the polymeric member.

The bio-carbon degree of the polymeric matrix can be found from results of measurement of the concentration of the $^{14}$C carried out by an accelerator mass spectrometry (AMS) method or a β-ray measuring method (for example, ASTM D6866). But the concentration of the $^{14}$C in the atmosphere fluctuates. Thus the concentration of the $^{14}$C contained in bioplastics also fluctuates each harvest year. Thus to find the bio-carbon degree exactly, it is necessary to amend the results of the measurement found by the above-described methods.

The kind of raw materials of the bioplastics is limited as compared with the polymer derived from the fossil resource. Further the bioplastics have frequently a low degree of freedom in performing conversion by fermentation and chemical conversion. Thus most of the bioplastics are ester polymers or amide polymers. From this, mostly the obtained bioplastics have hydrolyzability and biodegradability and in addition are inferior to resin derived from the fossil resource in their strength, toughness, heat resistance, and resistance to degradation. Thus the bioplastics have a problem that it is difficult to apply the bioplastics to mechanical parts demanded to have reliability.

As the polymeric matrix which can be used as the bioplastics in the present invention, the following substances are listed. Each of the following substances is composed by using a producing material in which a raw material derived from the biomass is contained at least partially or entirely: polyamides such as polylactic acid (PLA), poly3-hydroxybutanoic acid [P(3HB)], polyamide 11 (hereinafter also referred to as PA11), polyamide 6-10 (hereinafter also referred to as PA 6-10), polyamide 66 (hereinafter also referred to as PA 66); polyesters such as polybutylene succinate (hereinafter also referred to as PBS), polytrimethylene terephthalate (hereinafter also referred to as PTT), polybutylene terephthalate (hereinafter also referred to as PBT); and cellulose derivatives such as cellulose acetate (hereinafter also referred to as CA), cellulose acetate propionate (hereinafter also referred to as CAP), cellulose acetate butyrate (hereinafter also referred to as CAB) are listed. It is possible to use polymeric matrixes in which biomass raw materials are utilized partly or entirely for a monomer component used.

In addition to the polymeric matrixes listed above, it is possible to utilize a copolymer P[(3HB)-co-(3HV)] of 3-hydroxybutanoic acid and 3-hydroxyvalerianic acid, a copolymer (PBSA) in which a monomer of adipic acid is added to PBS as a copolymerizing component, a copolymer (PBSL) in which lactic acid monomer is added to the PBS, a copolymer (PBSCL) in which ε-caprolacton is added to the PBS, a copolymer (PBSC) in which carbonate is added to the PBS, phenol resin in which phenols obtained from polyphenol and lignin which are biomasses are used, and epoxy resin in which polyol and organic acid derived from biomasses are used. To improve toughness, it is also possible to combine a plurality of bioplastics with each other or utilize a technique of alloying the bioplastics with polymers derived from the fossil resource.

Of the above-described polymeric matrixes, PA 11, PA 6-10, PA 66, PTT, PBT or cellulose derivatives such as CA, CAP, CAB are preferable because these polymeric matrixes can be easily obtained by synthesizing and polymerizing raw materials derived from the biomasses at a relatively low cost, have high bio-carbon degrees, and have excellent resistance to biodegradability or hydrolysis, and are thus capable of easily securing reliability.

As the polymeric matrix which can be used as the polymeric elastic body in the present invention, amide thermoplastic elastomers obtained by synthesizing natural rubber, 11-amino undecanoic acid derived from castor oil, and the like are listed. In addition products obtained by blending these amide thermoplastic elastomers with synthetic rubber and synthetic resin such as polyvinyl chloride derived from the fossil resource are listed. Because the natural rubber is usually inferior in oil resistance and weather resistance, as necessary, the natural rubber is blended with the synthetic rubber or the synthetic resin derived from the fossil resource to obtain the bio-carbon degree not less than 15%.

It is preferable to add a fibrous filler to the $^{14}$C-containing polymeric matrixes in which the raw materials derived from the biomass are used. As the fibrous filler which can be utilized in the present invention, bamboo fiber, banana fiber, kenaf fiber, hemp fiber, coconut palm fiber, chitin fiber, chitosan fiber, cellulose fiber, lignin fiber, aramid fiber, polybenzamide (PBA) fiber, polyphenylene sulfide (PPS) fiber, paraphenylenebenzbisoxazole (PBZ) fiber are listed as an organic fiber. As an inorganic fiber, glass fiber, basalt fiber, wollastonite fiber, and carbon fiber are listed. As the carbon fiber, it is possible to use even the carbon fiber derived from the fossil resource and even the carbon fiber, derived from the biomass, which is produced by carbonizing spun fiber derived from the biomass, for example, lignin in an inert atmosphere such as in nitrogen atmosphere at about 1000° C. Of these fibrous fillers, the glass fiber is preferable from the standpoint of an environmental load, and the bamboo fiber and the carbon fiber derived from the biomass are preferable from the standpoint of carbon neutral.

It is preferable that the aspect ratios (length of fiber/diameter of fiber) of the above-described fibers are not less than 5. When the aspect ratio is less than 5, a retainer or a seal formed by molding the polymeric material is inferior in the strength, elastic modulus, dimensional precision, and dimensional stability thereof.

In addition to the fibrous filler, it is possible to add the following agents to the $^{14}$C-containing polymeric matrix in which the raw materials derived from the biomasses are contained according to the use of the rolling bearing: a reinforcing material such as a granulated substance, a plate-like material; a deterioration inhibitor or a deterioration prevention agent for restraining deterioration caused by heat, ultraviolet ray, oxidation, and hydrolysis; a plasticizer for improving moldability and flexibility of a molding; a softener; an additive such as an antistatic agent, a conductive agent; a dispersant; and a pigment.

To improve impact resistance of a molding, it is possible to use a method of improving the impact resistance such as rubber modification and a method of improving heat resistance by introducing a crosslinking structure to the molding by using a radical generating agent, a crosslinking agent, radiations, electron beams, and the like. In addition to improve gas barrier property, waterproof property, repellency, heat resistance, lubricity, oil resistance, and the like, the molding may be surface-treated with an inorganic substance such as diamond-like carbon (DLC), silica, and the like and coated with an organic substance such as resin.

In the present invention, of the surface of the molding obtained by molding the polymeric elastic body or the synthetic resin composition, it is preferable to form a barrier layer which restrains permeation of an atmospheric component on a part of the surface of the molding which is exposed to the atmosphere in which a member for the rolling bearing is used. The barrier layer is made of a material different from the polymeric elastic body or the synthetic resin composition composing the molding and is a surface layer having a lower transmission rate than the polymeric elastic body or the synthetic resin composition for the atmospheric component.

In the present invention, it is necessary to restrain the transmission of the atmospheric component which deteriorates the bioplastics through the molding. As the atmospheric component concerned with durability, oxygen gas, ozone gas, vapor, organic components composing lubricating oil and/or grease are listed.

There are a lot of bioplastics containing a amide bond and an ester bond. Subjected to hydrolysis of steam, the amide bond and the ester bond are liable to deteriorate. The oxygen gas and the ozone gas easily deteriorate the bioplastics by oxidation. The oxygen gas, the ozone gas, and the steam deteriorate the durability of the bioplastics singly or in combination. Therefore it is preferable to form a barrier layer against the oxygen gas, the ozone gas, and the steam which often deteriorate the durability of the bioplastics. As the surface layer to be formed as the gas barrier layer, at least one surface layer selected from a polymeric compound layer, a ceramic layer, and a metallic layer is exemplified.

It is possible to use the polymeric matrix superior to the material of the molding of the main body in the gas barrier property thereof for the polymeric compound layer. It is possible to use the polymeric matrix composed the raw material derived from the biomass superior to the material of the molding of the main body or the polymeric matrix derived from a fossil raw material. The polymeric matrix derived from the fossil raw material is a preferable polymeric matrix.

In the present invention, as the polymeric matrix usable as the surface layer and as the polymeric material derived from the fossil resource, both thermosetting resin and thermoplastic resin can be used. Examples of polymeric materials are listed as follows: That is, phenol resin, epoxy resin, urethane resin, polytetrafluoroethylene resin, chlorotrifluoroethylene resin, a tetrafluoroethylene-hexafluoropropylene copolymer, a tetrafluoroethylene-perfluoroalkylvinyl ether copolymer, vinylidene fluoride resin, an ethylene-tetrafluoroethylene copolymer, polyvinyl chloride, polyvinyl alcohol, low-density polyethylene resin, high-density or ultra-high molecular-weight polyethylene resin, water-bridge polyolefin resin, aromatic polyamide rein, polyacetal resin, polycarbonate resin, polystyrene resin, polyimide resin, polyetherimide resin, polyamide-imide resin, polyphenylene oxide resin, polyarylsulfone resin, polycyanoaryl ether resin, polyaryletherketone resin, polyphenylene sulfide resin, aromatic polyester resin, polyethylene terephthalate resin, aliphatic polyketone resin, polyoxazoline resin, and polymers called polymer blend and polymer alloy formed by mixing not less than two kinds of the above-described synthetic resins.

In the present invention, as the polymeric matrix usable as the surface layer and as the polymeric material derived from the biomass, of the above-described polymeric matrixes derived from the biomass, it is possible to use polymeric matrixes excellent in the gas barrier property when the main body and the surface layer are combined with each other.

As the ceramic layer, a ceramic film made of an oxide such as silica, alumina, and the like; a ceramic film made of non-oxide such as silicon nitride; and diamond-like carbon (DLC) are listed.

In the present invention, as the metal layer which can be used as the surface layer, a metal material which can be processed into a metal foil, a metal material which can be deposited on a plastic surface by electroless plating, and a metal material which can be formed into an evaporated film are listed.

As a method of forming the surface layer, a method of bonding or pressure bonding a thin film to the main body, a method of using physical or chemical vapor deposition, a thermal spray method, a film-forming method, an electroless plating method, and a method of joining different materials to each other by using two-color molding are listed.

By forming the surface layer, it is possible to improve the durability of the member for the bearing produced by using the molding of the synthetic resin composition or the polymeric elastic body obtained from the polymer obtained by using the producing raw material in which the raw material derived from an organism is contained at least partially as the matrix of the member for the bearing. There is only a limited number in raw materials for the polymeric material derived from organisms. The polymeric material derived from the organism has often a lower degree of freedom than the polymeric material derived from the fossil resource in performing conversion by fermentation and chemical conversion. Thus most of the polymeric material derived from the organism is ester polymers or amide polymers. Therefore it is necessary to prevent the polymeric matrix obtained from the polymeric material derived from the organism from being deteriorated by hydrolysis and heat to a higher extent than the polymeric material derived from the fossil resource.

By considering that the deterioration of the polymeric matrix is attributed to its chemical change and dealing with this from the standpoint of reaction kinetics, to find the relationship between a change in the property of a material and a temperature, namely, to find a heat-resistant life equation is adopted in the IEC Standards, the JIS Standards, the ASTM Standards, and the UL Standards. The heat-resistant life equation is based on a way of thinking that an activation energy of a change in the property of the material is equal to an activation energy of a chemical change in a chemical substance composing the material. Supposing that a life at a temperature T is t, the heat-resistant life equation is expressed by an equation (2) shown below. In the equation (2), a, $\Delta E$, and R denote a constant, the activation energy, and a gas constant respectively.

$$\text{Log } t = a + \Delta E/RT \qquad (2)$$

Drawing the above-described equation on a graph in which a logarithmic scale of the life t is taken on a vertical axis (y-axis) and a (1/T) scale is taken on a horizontal axis (x-axis), a linear relationship is obtained in the above-described life equation. The slope of a straight line is expressed as ($\Delta E/R$). A characteristic which decides the life of the material can be arbitrarily determined in characteristics necessary for the member for the rolling bearing. A concrete durability temperature is determined according to a determined life characteristic value.

Comparing a heat-resistant life straight line of a member (member A) of the present invention for the rolling bearing provided with the surface layer and that of a member (member B) of the present invention for the rolling bearing not provided with the surface layer with each other, both straight lines have slopes approximately equal to each other and move almost parallel with each other in such a way that the durability temperature of the member A is higher than that of the member B at a predetermined life characteristic value. The surface layer of the present invention is formed to achieve the above-described purpose and increase the continuous use temperature of the member B produced from the bioplastics.

The thickness of the surface layer varies according to a material thereof and the kind thereof. When the thickness of the surface layer is too large, there is an increase in the amount of components other than the bioplastics and there occurs a case in which the slopes of the heat-resistant life straight lines do not become almost equal to each other. When the thickness of the surface layer is too large, the member of the surface layer increases an environmental load, which is unpreferable. When the thickness of the surface layer is too thin, the slopes of the heat-resistant life straight lines are almost equal to each other, but the durability temperature is not improved.

The thickness of the surface layer is so set that the slopes of the heat-resistant life straight lines have the above-described relationship. Specifically when the surface layer consists of the polymeric compound layer, the thickness of the surface layer is 0.1 to 2000 μm and preferably 1 to 1000 μm. When the surface layer consists of the ceramic layer, the thickness thereof is 0.01 to 500 μm and preferably 0.1 to 200 μm. When the surface layer consists of the metal layer, the thickness thereof is 0.1 to 500 μm and preferably 0.5 to 200 μm.

An example of the rolling bearing of the present invention is described below with reference to FIG. 1. FIG. 1 is a sectional view of a grease-enclosed deep groove ball bearing 1. The deep groove ball bearing 1 has an inner ring 2 having an inner ring rolling surface 2a on its peripheral surface, an outer ring 3 having an outer ring rolling surface 3a on its inner peripheral surface, with the outer ring 3 and the inner ring 2 being concentric with each other, and a plurality of rolling elements 4 disposed between the inner ring rolling surface 2a and the outer ring rolling surface 3a. A retainer 5 holding the plurality of rolling elements 4 is provided. A sealing member 6 fixed to the outer ring 3 is provided at openings 8a and 8b, of the inner ring 2 and the outer ring 3, which are disposed at both axial ends thereof. Grease 7 is enclosed on at least the peripheries of the rolling elements 4.

In the present invention, it is preferable that the retainer 5 is formed as the molding of the synthetic resin composition composed of the polymeric matrix obtained by using the raw material derived from the biomass and that the sealing member 6 is formed as the molding of the polymeric elastic body or the synthetic resin composition both composed of the polymeric matrix obtained by using the raw material derived from the biomass. It is also preferable to add the fibrous filler to the polymeric matrix. It is also preferable to compose the inner ring 2, the outer ring 3, and the rolling elements 4 of steel or ceramics.

Figure 2:
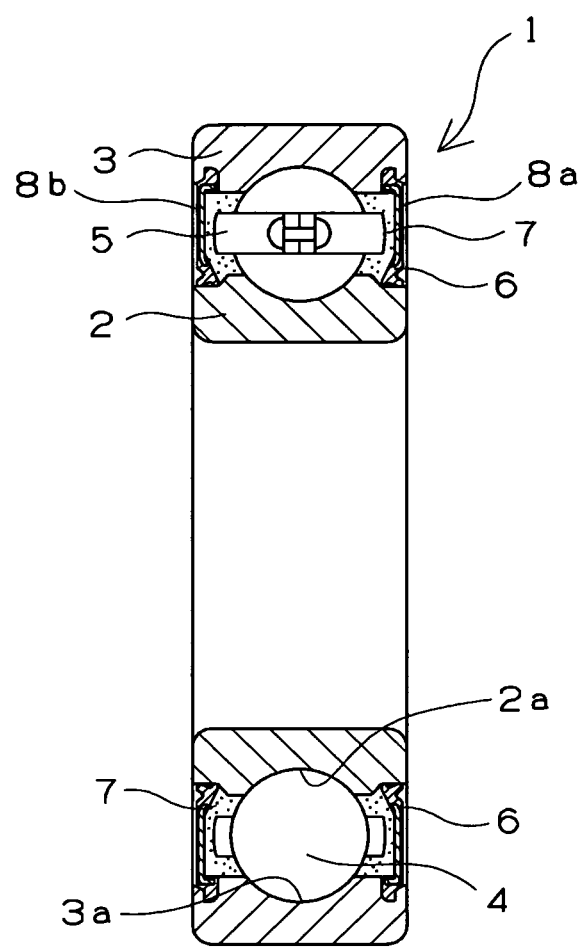
FIG. 2 is a sectional view of the grease-enclosed deep groove ball bearing (provided with a core of a sealing member)

As shown in FIG. 2, the sealing member 6 may be formed as a complex of the molding of the polymeric elastic body derived from the biomass or the synthetic resin composition derived from the biomass and a metal plate, a plastic plate, and a ceramic plate.

Figure 3:
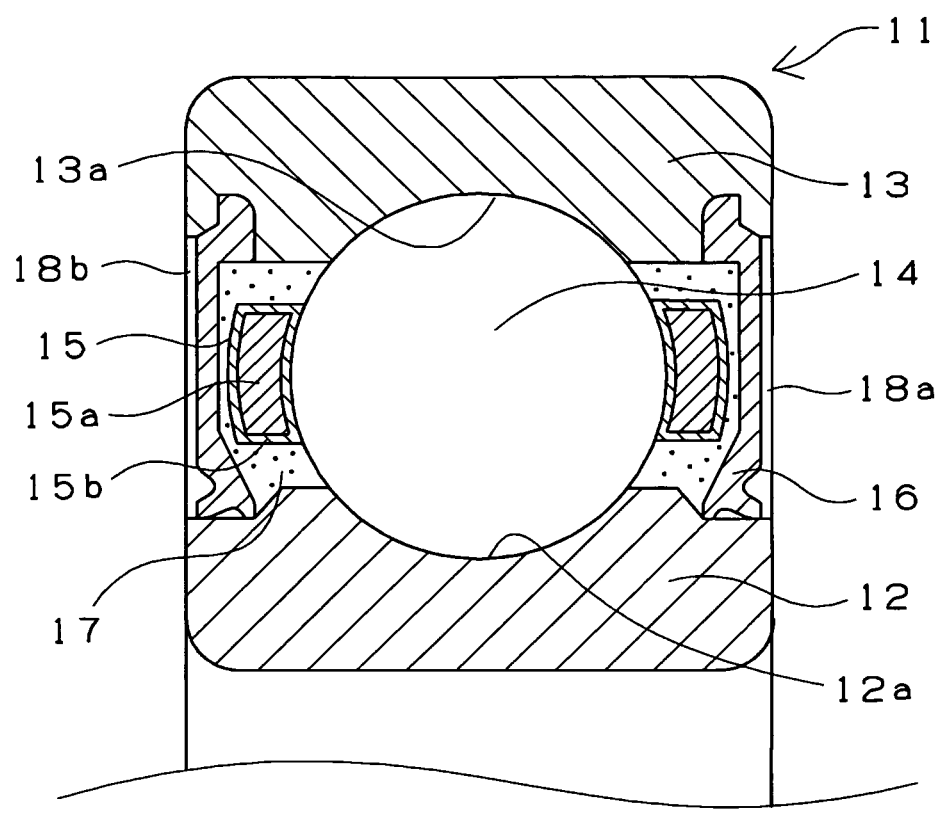
FIG. 3 is a sectional view of a grease-enclosed deep groove ball bearing in which a surface layer is formed on a surface of a retainer.

Another example of the rolling bearing of the present invention is described below with reference to FIG. 3. FIG. 3 is a sectional view of a grease-enclosed deep groove ball bearing 11. The deep groove ball bearing 11 has an inner ring 12 having an inner ring rolling surface 12a on its peripheral surface, an outer ring 13 having an outer ring rolling surface 13a on its inner peripheral surface, with the outer ring 13 and the inner ring 12 being concentric with each other, and a plurality of rolling elements 14 disposed between the inner ring rolling surface 12a and the outer ring rolling surface 13a. A retainer 15 holding the plurality of rolling elements 14 is provided. A sealing member 16 fixed to the outer ring 13 is provided at openings 18a and 18b, of the inner ring 12 and the outer ring 13, which are disposed at both axial ends thereof. Grease 17 is enclosed on at least the peripheries of the rolling elements 14. In FIG. 3, the retainer 15 is formed as a molding 15a of the synthetic resin composition composed of the polymeric matrix obtained by using the raw material derived from the biomass. The surface of the molding 15a is covered with a surface layer 15b. It is preferable to compose the inner ring 12, the outer ring 13, and the rolling elements 14 of steel or ceramics.

Figure 4:
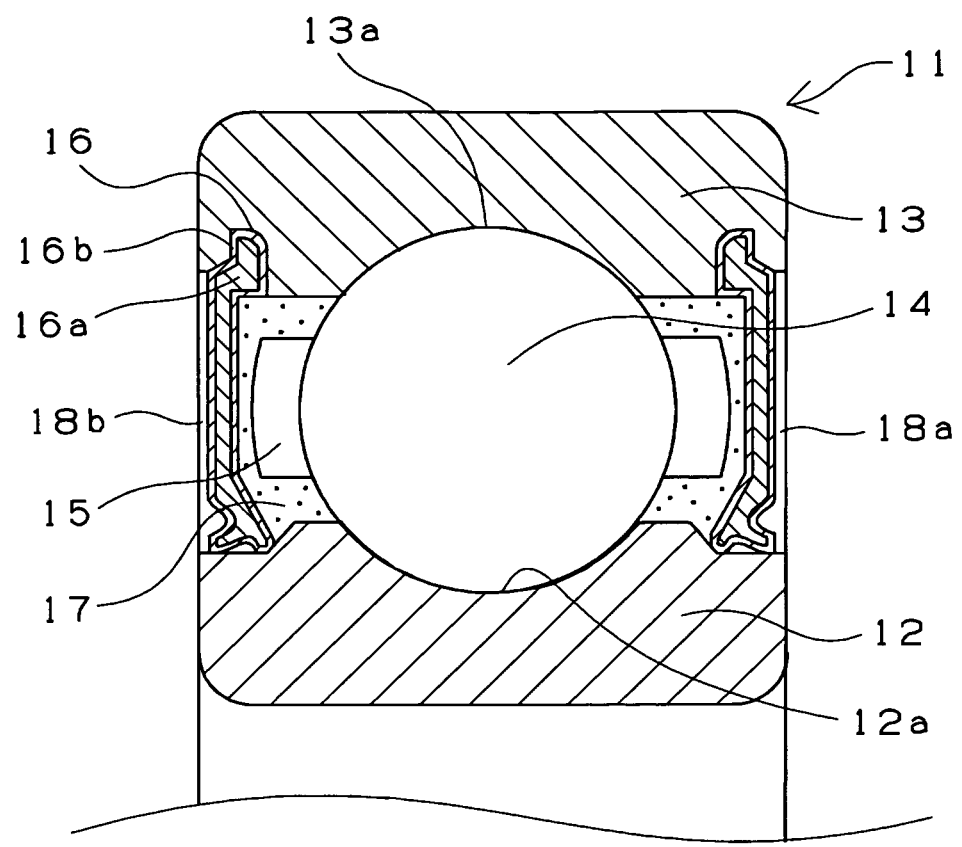
FIG. 4 is a sectional view of a grease-enclosed deep groove ball bearing in which a surface layer is formed on a surface of a sealing member.

As shown in FIG. 4, the sealing member 16 is formed as a molding 16a of the polymeric elastic body derived from the biomass or the synthetic resin composition derived from the biomass. The surface of the molding 16a is covered with a surface layer 16b. The sealing member 16 may be formed as a complex of a metal plate, a plastic plate, and a ceramic plate.

As a method of lubricating the rolling bearing of the present invention, any of known lubricating methods such as grease lubrication, oil lubrication, air oil lubrication, and solid lubrication may be adopted. When the grease lubrication and the oil are adopted, it is possible to use not only a material, hitherto used, such as mineral oil derived from the fossil resource but also a material to which biodegradability is imparted and a material to which a raw material derived from the biomass is applied.

In this embodiment, although the rolling bearing has been described by exemplifying the deep groove ball bearing, the rolling bearing of the present invention is applicable to various rolling bearings and a bearing unit part incorporating the various rolling bearings. The rolling bearing of the present invention is applicable to a radial rolling bearing such as an angular ball bearing, a self-aligning ball bearing, a cylindrical roller bearing, a tapered roller bearing, and a needle roller bearing, a self-aligning roller bearing; and a thrust rolling bearing such as a thrust ball bearing and a thrust roller bearing.

EXAMPLES

By using the polymeric member shown in examples described below for a retainer and a sealing member, it is possible to produce rolling bearings having the constructions shown in FIGS. 1 and 3. Supposing that 1000 g of the retainer and the seal produced by using the polymeric member were completely burnt, the amount of emitted carbon dioxide was calculated from the amount of carbon contained in the polymeric member.

Example 1

A case in which a polymeric member composed of only a polymer consisting of a raw material derived from a biomass (containing $^{14}C$) was used is shown. Thus all carbon elements composing the polymeric component of the polymer are derived from the biomass (bio-carbon degree: 100%). Because the bio-carbon degree is 100%, the amount of carbon dioxide the polymeric component decomposes and generates at the time of disposal of the polymeric member of the example 1 by incineration is substantially zero. Comparing the case in which the polymer of the example 1 was used with a case in which a polymer produced by using a 100% fossil resource raw material was used, the reduction rate of carbon dioxide emission at the time of the disposal of the polymeric member of the example 1 by incineration is 100%. When the polymer of the example 1 is used for the polymeric member for the rolling bearing, the effect of reducing the carbon dioxide emission is conspicuously high.

As the polymer having the bio-carbon degree at 100%, PLA obtained by polymerizing L body lactic acid or D body lactic acid obtained by a fermentation method via sugar derived from a natural product and a mixture of the L body lactic acid and D body lactic acid, PA11 produced by polymerizing 11-amino undecanoic acid obtained from undecylenic acid or the like obtained by synthesis via castor oil, PBS produced by synthesizing succinic acid obtained via pyruvic acid or the like derived from glucose and 1,4-butanediol obtained by synthesis via the succinic acid, celluloses obtained by modifying raw materials derived from biomasses, PA66 obtained by polymerizing adipic acid with hexamethylene diamine obtained from furfural obtained in a saccharification process of celluloses which are biomasses via adiponitrile or the like, and PA 6-10 produced by polymerizing the hexamethylene diamine obtained via furfural with sebacic acid synthesized via castor oil are listed. Because these polymers are moldable, they can be molded into the retainer and the sealing member. These polymers are obtained by polymerizing raw materials derived from the biomasses. Thus in principle $^{14}C$ is always contained in each polymeric matrix.

Example 2

A case in which a polymeric member composed of a polymer consisting of a raw material (containing $^{14}C$), derived from a biomass, which contained 62.5% of all carbon elements composing the polymeric component thereof and a raw material (not containing $^{14}C$) derived from a fossil resource, which contained 37.5% of all the carbon elements was used is shown (bio-carbon degree: 62.5%). The amount of the carbon element of the raw material derived from the fossil resource is 37.5%. Thus when the polymeric component completely decomposes at the time of disposal of the polymeric member of the example 2 by incineration, the amount of carbon dioxide generated thereby is 37.5% in comparison with a polymer produced entirely from the raw material derived from the fossil resource. Therefore comparing the case in which the polymer of the example 2 was used with the case in which the polymer produced entirely from the raw material derived from the fossil resource was used, the rate of the carbon dioxide emissions reduction at the time of disposal of the polymeric member of the example 2 by incineration is 62.5%. When the polymeric component of the example 2 is used for the polymeric matrix for the rolling bearing, the effect of reducing the carbon dioxide emission is very high.

As the polymer having the bio-carbon degree at 62.5%, PA 6-10 produced by polymerizing the sebacic acid obtained by synthesis of the castor oil which is a biomass with the hexamethylene diamine derived from the fossil resource is exemplified. Because this polymer is moldable, it can be molded into the retainer and the sealing member. This polymer is obtained by polymerizing the raw material derived from the biomass. Thus in principle $^{14}C$ is always contained in the polymeric matrix.

Example 3

A case in which a polymeric member composed of a polymer consisting of a raw material (containing $^{14}C$), derived from a biomass, which contained 50% of all carbon elements composing the polymeric component thereof and a raw material (not containing $^{14}C$) derived from a fossil resource, which contained 50% of all the carbon elements was used is shown (bio-carbon degree: 50%). The amount of the carbon element of the raw material derived from the fossil resource is 50%. Thus when the polymeric component completely decomposes at the time of disposal of the polymeric member of the example 3 by incineration, the amount of the carbon dioxide generated thereby is 50% in comparison with a polymer produced entirely from a raw material derived from a fossil resource. Therefore comparing the case in which the polymer of the example 3 was used with the case in which the polymer produced entirely from the raw material derived from the fossil resource was used, the rate of the carbon dioxide emissions reduction at the time of disposal of the polymeric member of the example 3 by incineration is 50%. When the polymeric component of the example 3 is used for the polymeric matrix for the rolling bearing, the effect of reducing the carbon dioxide emission is very high.

As a polymer having the bio-carbon degree at 50%, PBS is exemplified. The PBS is produced from succinic acid (or dimethyl succinate) and 1,4-butanediol. Only one of these two substances is produced from a raw material derived from a biomass. This polymer is moldable and thus can be molded into the retainer and the sealing member. This polymer is obtained by polymerizing the raw material derived from the biomass. Thus in principle $^{14}C$ is always contained in the polymeric matrix.

Example 4

A case in which a polymeric member composed of a polymer consisting of a raw material (containing $^{14}C$), derived from a biomass, which contained about 27% of all carbon elements composing the polymeric component thereof and a raw material (not containing $^{14}C$), derived from a fossil resource, which contained about 73% of all the carbon elements was used is shown (bio-carbon degree: 27%). The amount of the carbon element of the raw material derived from the fossil resource is 73%. Thus when the polymeric component completely decomposes at the time of disposal of the polymeric member of the example 4 by incineration, the amount of the carbon dioxide generated thereby is 73% in comparison with the polymer produced entirely from the raw material derived from the fossil resource. Therefore comparing the case in which the polymer of the example 4 was used with the case in which the polymer produced entirely from the raw material derived from the fossil resource was used, the rate of the carbon dioxide emissions reduction at the time of disposal of the polymeric member of the example 4 by incineration is 27%. When the polymeric component of the example 4 is used for the polymeric matrix for the rolling bearing, the effect of reducing the carbon dioxide emission is high.

As such a polymer, PTT produced from 1,3-propanediol obtained from starch which is a biomass and terephthalic acid (or dimethyl terephthalate) derived from a fossil resource is exemplified. This polymer is moldable and thus can be molded into the retainer and the sealing member. This polymer is obtained by polymerizing the raw material derived from the biomass. Thus in principle $^{14}C$ is always contained in the polymeric matrix.

Example 5

A case in which a polymeric member composed of a polymer consisting of a raw material (containing $^{14}C$), derived from a biomass, which contained about 17% of all carbon elements composing the polymeric component thereof and a raw material (not containing $^{14}C$), derived from a fossil resource, which contained about 83% of all the carbon elements was used is shown (bio-carbon degree: 17%). The amount of the carbon element of the raw material derived from the fossil resource is 83%. Thus when the polymeric component completely decomposes at the time of disposal of the polymeric member of the example 5 by incineration, the amount of the carbon dioxide generated thereby is 83% in comparison with a polymer produced entirely from the raw material derived from the fossil resource. Therefore comparing the case in which the polymer of the example 5 was used with the case in which the polymer produced entirely from the raw material derived from the fossil resource was used, the rate of the carbon dioxide emissions reduction at the time of disposal of the polymeric member of the example 5 by incineration is 17%. When the polymeric component of the example 5 is used for the polymeric matrix for the rolling bearing, the effect of reducing the carbon dioxide emission is high.

As such a polymer, PBT obtained by polymerizing the terephthalic acid (or dimethyl terephthalate) derived from the fossil resource with half of 1,4-butanediol obtained by synthesizing a biomass, for example, a raw material (containing $^{14}C$) derived from the succinic acid and with the remaining half of the 1,4-butanediol which is a raw material derived from a fossil resource. This polymer is moldable and thus can be molded into the retainer and the sealing member. This polymer is obtained by polymerizing the raw material derived from the biomass. Thus in principle $^{14}C$ is always contained in the polymeric matrix.

Comparative Example 1

A case in which a rolling bearing having a construction shown in FIG. 1 is produced by using a retainer produced by using PA66 (polymer which is derived from a fossil resource and does not contain $^{14}C$) obtained by polymerizing the hexamethylene diamine obtained from propylene via acrylonitrile or the like with the adipic acid and by using a sealing member produced by using NBR rubber derived from a fossil resource is shown. Because all the polymeric members for the bearing are derived from the fossil resources, the bio-carbon degree is 0%.

In discarding the rolling bearings produced in the examples and the comparative examples, the retainers and the seals made of the polymers combust and decompose and are emitted to the atmosphere as carbon dioxide. A case in which the retainer and the seal composed of the polymer are produced from raw materials derived from fossil resources is set as a reference (comparative example 1). The bio-carbon degree and the emission rate in cases (comparative examples 1 through 5) where bioplastics produced entirely or partially from raw materials derived from the biomasses were used are shown in table 1. Of emitted carbon dioxide, the carbon dioxide, containing carbon, which is derived from the biomass (hereinafter referred to as bio-carbon) does not increase carbon dioxide in the atmosphere from the standpoint of carbon neutral. Therefore the carbon dioxide containing the carbon derived from the biomass is not contained in the carbon dioxide emission.

TABLE 1

|  | Example 1 | Example 2 | Example 3 | Example 4 | Example 5 | Comparative example 1 |
|---|---|---|---|---|---|---|
| Bio-carbon degree | 100% | 62.5% | 50% | 27% | 17% | 0% |
| Emission rate of $CO_2$ at time of discarding by incinecation | 0% | 37.5% | 50% | 73% | 83% | 100% |
| Reduction rate of emitted $CO_2$ at time of discarding by incinecation | 100% | 62.5% | 50% | 27% | 17% | 0% |

Example 6

A polymeric member composed of PBS obtained by polymerizing the 1,4-butanediol, derived from the fossil resource, which was used as the raw material of the polymeric matrix with the succinic acid, derived from the biomass, which was also used as the raw material thereof and 25 wt % of glass fiber added to the PBS was used. Because the succinic acid derived from the biomass was used as the raw material of the polymeric member, the polymeric member of the example 6 contains the $^{14}C$. The bio-carbon degree of the polymeric member of the example 6 is 50% in comparison with the PBS obtained by polymerizing the raw material entirely derived from the fossil resource. Therefore the polymeric member is capable of substantially reducing the amount of the carbon dioxide emitted owing to combustion of the polymeric member by 50% in the process of discarding and recycling the rolling bearing. For example, comparing the polymeric member of the example 6 with a case in which the polymeric member composed of the PA66 (not containing $^{14}C$), derived from the fossil resource, which is conventionally used as a material of the retainer of the bearing and 25 wt % of the glass fiber added to the PA66 is used, the polymeric member is capable of substantially reducing the carbon dioxide emission by 56%.

Example 7

A polymeric member composed of PLA obtained by polymerizing the L body lactic acid or D body lactic acid obtained by synthesis via sugar derived from a natural product and a polymer composed of 20 wt % of glass fiber added to the PLA which obtained by mixing the L body lactic acid and D body lactic acid with each other was used. The PLA obtained by polymerizing the lactic acid derived from the biomass contains $^{14}C$. The bio-carbon degree of the polymeric member of the example 7 is 100% in comparison with the PLA obtained by polymerizing the raw material entirely derived from the fossil resource. Therefore it is possible to substantially reduce the amount of the carbon dioxide emitted by combustion of the polymeric member to zero in the process of discarding and recycling the rolling bearing. For example, comparing the case in which the polymeric member of the example 7 was used with the case in which the polymeric member composed of the PA66 (not containing $^{14}C$), derived from the fossil resource, which is conventionally used as a material of the retainer for the rolling bearing and 25 wt % of the glass fiber added to the PA66 was used, the polymeric member is capable of substantially reducing the carbon dioxide emission by 100%.

Example 8

A polymeric member composed of PA 11 produced from undecylenic acid obtained by synthesis via the castor oil derived from a natural product and 30 wt % of glass fiber added to the PA 11 was used. Because the castor oil derived from the biomass was used as a starting raw material, the PA 11 contains the $^{14}C$. The bio-carbon degree of the polymeric member of the example 8 is 100% in comparison with the PA 11 obtained by polymerizing the raw material entirely derived from the fossil resource. Therefore it is possible to substantially reduce the amount of the carbon dioxide emitted by combustion of the polymeric member to zero in the process of discarding and recycling the rolling bearing. Comparing the case in which the polymeric member of the example 8 was used with the case in which the polymeric member composed of the PA66 (not containing $^{14}C$), derived from the fossil resource, which is conventionally used as a material of the retainer for the rolling bearing and 25 wt % of the glass fiber added to the PA66 was used, the polymeric member is capable of substantially reducing the carbon dioxide emission by 100%.

Example 9

A polymeric member composed of PTT produced from 1,3-propanediol obtained from starch which is the biomass derived from a natural product and the terephthalic acid (or dimethyl terephthalate) derived from the fossil resource and 30 wt % of the glass fiber added to the PTT was used. Because the starch derived from the biomass is used as the starting raw material, the PTT contains the $^{14}C$. The bio-carbon degree of the polymeric member of the example 9 is about 27% in comparison with PTT obtained by polymerizing the raw material entirely derived from the fossil resource. Therefore it is possible to substantially reduce the amount of the carbon dioxide emitted by combustion of the polymeric member by 73% in the process of discarding and recycling the rolling bearing. Comparing the case in which the polymeric member of the example 9 was used with the case in which the polymeric member composed of the PA66 (not containing $^{14}C$), derived from the fossil resource, which is conventionally used as a material of the retainer for the rolling bearing and 25 wt % of the glass-fiber added to the PA66 was used, the polymeric member is capable of substantially reducing the carbon dioxide emission by 32%.

Example 10

A polymeric member composed of bio-PBT obtained by polymerizing the terephthalic acid (or the dimethyl terephthalate) derived from the fossil resource with half of the 1,4-butanediol obtained by synthesizing the biomass, for example, a raw material (containing $^{14}C$) derived from the succinic acid and with the remaining half of the 1,4-butanediol which is the raw material derived from the fossil resource and 30 wt % of glass fiber added to the bio-PBT was used. Because the 1,4-butanediol derived from the biomass was used as a part of the raw material of the polymeric member, the bio-PBT contains $^{14}C$. The bio-carbon degree of the polymeric member of the example is about 17% in comparison with the PBT obtained by polymerizing the raw material entirely derived from the fossil resource. Therefore it is possible to substantially reduce the amount of the carbon dioxide emitted by combustion of the polymeric member by 83% in the process of discarding and recycling the rolling bearing. Comparing the case in which the polymeric member of the example 10 was used with the case in which the polymeric member composed of the PA66 (not containing $^{14}C$), derived from the fossil resource, which is conventionally used as a material of the retainer for the rolling bearing and 25 wt % of the glass fiber added to the PA66 was used, the polymeric member is capable of substantially reducing the carbon dioxide emission by 21%.

Example 11

A polymeric member composed of bio-PA66 obtained by polymerizing the hexamethylene diamine obtained from the furfural obtained in a saccharification process of celluloses which are the biomass via adiponitrile or the like with the adipic acid and 25 wt % of the glass fiber added to the bio-PA66 was used. Because the celluloses derived from the biomass are used as the starting raw material, the bio-PA66 contains the $^{14}C$. The bio-carbon degree of the polymeric member of the example 11 is 100% in comparison with the PA 66 obtained by polymerizing the raw material entirely derived from the fossil resource. Therefore it is possible to substantially reduce the amount of the carbon dioxide emitted by combustion of the polymeric member to zero in the process of discarding and recycling the rolling bearing. Comparing the case in which the polymeric member of the example 11 was used with the case in which the polymeric member composed of the PA66 (not containing $^{14}C$), derived from the fossil resource, which is conventionally used as a material of the retainer for the rolling bearing and 25 wt % of the glass fiber added to the PA66 was used, the polymeric member is capable of substantially reducing the carbon dioxide emission by 100%.

Example 12

A polymeric member composed of bio-PA66 similar to that of the example 6 and 25 wt % of carbon fiber, derived from a fossil resource, which was added to the bio-PA66 was used. Because the celluloses derived from the biomass are used as the starting raw material, the bio-PA 66 contains the $^{14}C$. The bio-carbon degree of the polymeric member of the example 12 is 100% in comparison with PA 66 obtained by polymerizing the raw material entirely derived from the fossil resource. Therefore although the polymeric member contains 20 wt % of the carbon fiber derived from the fossil resource, it is possible to substantially reduce the amount of the carbon dioxide emitted by combustion of the polymeric member by 28% in the process of discarding and recycling the rolling bearing. Comparing the case in which the polymeric member of the example 12 was used with the case in which the polymeric member composed of the PA66 (not containing $^{14}C$), derived from the fossil resource, which is conventionally used as a material of the retainer for the rolling bearing and 25 wt % of the glass fiber added to the PA66 was used, the polymeric member is capable of substantially reducing the carbon dioxide emission by 58%.

Example 13

A polymeric member composed of bio-PA6-10 obtained by polymerizing the hexamethylene diamine obtained from the furfural obtained in a saccharification process of celluloses which are the biomass via adiponitrile or the like with the sebacic acid obtained by pyrolysis and purification of the castor oil and 25 wt % of the glass fiber added to the bio-PA6-10 was used. Because the celluloses derived from the biomass are used as the starting raw material, the bio-PA6-10 contains the $^{14}C$. The bio-carbon degree of the polymeric member of the example 13 is 100% in comparison with the PA66 obtained by polymerizing the raw material entirely derived from the fossil resource. Therefore it is possible to substantially reduce the amount of the carbon dioxide emitted by combustion of the polymeric member to zero in the process of discarding and recycling the rolling bearing. Comparing the case in which the polymeric member of the example 13 was used with the case in which the polymeric member composed of the PA66 (not containing $^{14}C$), derived from the fossil resource, which is conventionally used as a material of the retainer for the rolling bearing and 25 wt % of the glass fiber added to the PA66 was used, the polymeric member is capable of substantially reducing the carbon dioxide emission by 100%.

Comparative Example 2

The polymeric member composed of PA66 (not containing $^{14}C$), derived from the fossil resource, which is conventionally used as a material of the retainer for the rolling bearing and 25 wt % of glass beads added to the PA66 was used. Because the PA66 is obtained by polymerizing the raw materials entirely derived from the fossil resources, the polymeric member of the comparative example 2 is incapable of reducing the amount of the carbon dioxide emitted by combustion of the polymeric member in the process of discarding and recycling the rolling bearing. Comparing the case in which the polymeric member of the comparative example 2 was used with the case in which the polymeric member composed of the PA66 (not containing $^{14}C$), derived from the fossil resource, which is conventionally used as a material of the retainer for the rolling bearing and 25 wt % of the glass fiber added to the PA66 was used, the carbon dioxide emission of the polymeric member of the comparative example 2 was almost equal to that of the above-described polymeric member.

Comparative Example 3

The polymeric member consisting of only the PA66 (not containing $^{14}C$), derived from the fossil resource, which is conventionally used as a material of the retainer for the rolling bearing was used. No reinforcing agent was added to the PA 66. Because the PA66 is obtained by polymerizing the raw materials entirely derived from the fossil resources, polymeric member is incapable of reducing the amount of the carbon dioxide emitted by combustion of the polymeric member in the process of discarding and recycling the rolling bearing. Comparing the case in which the polymeric member of the comparative example 3 with the case in which the polymeric member composed of the PA66 (not containing $^{14}C$), derived from the fossil resource, which is conventionally used as a material of the retainer for the rolling bearing and 25 wt % of the glass fiber added to the PA66 was used, the carbon dioxide emission of the polymeric member of the comparative example 3 increases to 33% because there is an increase in the amount of the polymeric component which generates carbon dioxide.

In discarding the rolling bearings produced in the examples and the comparative examples, the retainers and the seals made of the polymers used in the examples and the comparative examples combust and decompose and are emitted to the atmosphere as the carbon dioxide. Supposing that 1000 g of each of the polymeric members used as the retainers or the seals combust and decompose and that the carbon elements contained in the polymeric members are emitted to the atmosphere as the carbon dioxide, the carbon dioxide emissions in the examples and the comparative examples were compared with one another. Table 1 shows the results. The carbon dioxide emissions were compared with one another by setting cases (the examples) in which bioplastics produced entirely or partially from raw materials derived from the biomasses were used as the reference and setting cases (comparative examples) in which the polymeric retainers and seals were produced from raw materials derived from the fossil resource as the reference. The amount of the carbon dioxide, containing carbon, which is derived from the biomasses, does not increase carbon dioxide in the atmosphere. Therefore the carbon dioxide containing the carbon derived from the biomasses is not contained in the carbon dioxide emission.

TABLE 2

| | Example | | | | | | | | Comparative example | |
|---|---|---|---|---|---|---|---|---|---|---|
| | 6 | 7 | 8 | 9 | 10 | 11 | 12 | 13 | 2 | 3 |
| Polymeric material (wt %) | | | | | | | | | | |
| Containing raw material derived from biomass | | | | | | | | | | |
| PBS | 75 | — | — | — | — | — | — | — | — | — |
| PLA | — | 80 | — | — | — | — | — | — | — | — |
| PA11 | — | — | 70 | — | — | — | — | — | — | — |
| PTT | — | — | — | 70 | — | — | — | — | — | — |
| BioPBT | — | — | — | — | 70 | — | — | — | — | — |
| BioPA66 | — | — | — | — | — | 75 | 80 | — | — | — |
| BioPA6-10 | — | — | — | — | — | — | — | 75 | — | — |
| Material derived from fossil resource | | | | | | | | | | |
| PA66 | — | — | — | — | — | — | — | — | 75 | 100 |
| Filler (wt %) | | | | | | | | | | |
| Glass fiber[1)] | 25 | 20 | 30 | 30 | 30 | 25 | — | 25 | — | — |
| Carbon fiber[2)] | — | — | — | — | — | — | 20 | — | — | — |
| Glass beads[3)] | — | — | — | — | — | — | — | — | 25 | — |
| Mass before burning (g) | 1000 | 1000 | 1000 | 1000 | 1000 | 1000 | 1000 | 1000 | 1000 | 1000 |
| Weight of polymeric matrix (wt %) | 75 | 80 | 70 | 70 | 70 | 75 | 80 | 75 | 75 | 100 |
| Residue after burning (wt %) | 25 | 20 | 30 | 30 | 30 | 25 | 20 | 25 | 25 | 0 |
| $CO_2$ emission during burning (g) | 1533 | 1465 | 1848 | 1643 | 1678 | 1750 | 2600 | 1752 | 1750 | 2333 |
| Bio-carbon degree (%) | 50 | 100 | 100 | 27 | 17 | 100 | 100 | 100 | 0 | 0 |
| $CO_2$ emission from carbon derived from biomass (g) | 767 | 1465 | 1848 | 448 | 290 | 1750 | 1866 | 1752 | 0 | 0 |
| Substantial $CO_2$ emission (g)[4)] | 766 | 0 | 0 | 1195 | 1388 | 0 | 734 | 0 | 1750 | 2333 |

TABLE 2-continued

|  | Example | | | | | | | | Comparative example | |
| --- | --- | --- | --- | --- | --- | --- | --- | --- | --- | --- |
|  | 6 | 7 | 8 | 9 | 10 | 11 | 12 | 13 | 2 | 3 |
| $CO_2$ emission rate (%)[5)] | 50 | 0 | 0 | 73 | 83 | 0 | 28 | 0 | 100 | 100 |
| Reduction rate of $CO_2$ emission (%)[6)] | 56 | 100 | 100 | 32 | 21 | 100 | 58 | 100 | 0 | −33 |

[1)]Average fiber diameter: 10 to 17 μm, average fiber length: 100 to 300 μm, aspect racio: not less than 5
[2)]Average fiber diameter: 6 to 13 μm, average fiber length: 70 to 300 μm, aspect racio: not less than 5
[3)]Average fiber diameter: 5 to 30 μm, aspect racio: about 1
[4)]Substantial $CO_2$ emission (g) = $CO_2$ emission during burning (g) − $CO_2$ emission from carbon derived from biomass (g)
[5)]$CO_2$ emission rate (%) = [Substantial $CO_2$ emission (g)/$CO_2$ emission during burning (g)] × 100
[6)]Comparison criteria: polymeric member composed of PA66 derived from fossil resource and 25 wt % of glass fiber added to PA66

As compared with the material containing the polyamide 66 (PA66), derived from the fossil resource, which is normally used as the retainer for the bearing and 25 wt % of the glass fiber added to the polyamide 66, the examples 6 through 13 in which various bioplastics were used are capable of reducing the carbon dioxide emission by about 20 to 100%, although the carbon dioxide emission varies according to the polymeric materials and the raw materials thereof.

Example 14

The celluloses obtained by modifying raw materials derived from biomasses, the polyamide 66 obtained by polymerizing the hexamethylene diamine obtained from the furfural obtained in a saccharification process of celluloses via adiponitrile, and the adipic acid with each other can be a material derived from the biomass (biomass plastics containing $^{14}$C). By using commercially available Ultramid A3HG5 (produced by BASF-Corporation) composed of the polyamide 66 and 25 wt % of the glass fiber added thereto, a retainer and a film (thickness: about 80 μm) for evaluation were produced by using an injection molding machine.

A thin film of diamond-like carbon (DLC) was formed on a surface of a retainer and that of a film for evaluation by a plasma ion implantation method. Two kinds of the DLC films having a thickness of 5 nm and 20 nm respectively were prepared. By using the obtained film for evaluation, water vapor permeability (g/(m²·day)) was measured. The water vapor permeability was measured in accordance with the method specified in JIS K7129. As a result, the water vapor transmission rate (%) expressed by setting the water vapor permeability of the film for evaluation on which the DLC film was not formed to 100% was 41.9% in the case of the DLC film having the thickness of 5 nm and 19.4% in the case of the DLC film having the thickness of 20 nm.

By setting a period of time in which the tensile strength becomes half of an initial value as a lifetime value, the lifetime was measured at a plurality of temperatures higher than a room temperature. The lifetime was measured by using the above-described film specimen for evaluation of ASTM No. 1 dumbbell. The DLC film was formed on both surfaces of the film. A linear relationship is obtained by taking temperatures at which the water-vapor permeability was measured on a horizontal axis where a (1/K) scale was plotted and taking the lifetime on a vertical axis where a logarithmic scale was plotted.

The degrees of the activation energies of the deterioration obtained from the slope of the linear relationship were 16.5 kcal/mol in the case of the polyamide 66 on which the DLC film was not formed, 17.8 kcal/mol in the case of the DLC film, formed on the polyamide 66, which had the thickness of 5 nm, and 15.8 kcal/mol in the case of the DLC film, formed on the polyamide 66, which had the thickness of 20 nm. Thus the degrees of the activation energies were almost equal. A 100,000-hour continuous use temperature found from the life straight line was 106° C. in the case of the polyamide 66 on which the DLC film was not formed, 109° C. in the case of the DLC film, formed on the polyamide 66, which had the thickness of 5 nm, and 122° C. in the case of the DLC film, formed on the polyamide 66, which had the thickness of 20 nm.

From the results, it has been found that it is possible to improve the continuous use temperature of the polymeric member on which the film (surface layer) having the gas barrier property is formed over that of the polymeric member on which the film having the gas barrier property is not formed. This is considered that by restraining a gas from permeating the matrix, the progress of decomposition of resin becomes slow in the relationship between the thickness of the film having the gas barrier property and the performance improvement rate and as a result, the deterioration of the property is suppressed.

INDUSTRIAL APPLICABILITY

The member of the present invention for the rolling bearing and the rolling bearing using the member do not substantially emit carbon dioxide or are capable of restraining the carbon dioxide emission in the process of discarding and recycling the rolling bearing and thus apply a low extent of load on environment. Therefore they are widely applicable to machines and apparatuses capable of restraining global warming. By reinforcing the material thereof with the fibrous filler, they are also widely applicable to general machines, apparatuses, and cars. Further by forming the surface layer having a gas barrier property, it is possible to greatly suppress deterioration of the property of a resin material hitherto used and improve the continuous use temperature. Thus they are widely applicable to machines and apparatuses capable of restraining global warming.

The invention claimed is:

1. A member for a rolling bearing comprising a molding of a polymeric elastic body or a synthetic resin composition,
said member for said rolling bearing being at least one member selected from among an inner ring, an outer ring, a rolling element, a retainer, and a sealing member,
said polymeric elastic body or said synthetic resin composition comprises a polymeric matrix produced by at least partially using a raw material derived from a biomass,
wherein said polymeric matrix comprises polyamide 66,
wherein a bio-carbon degree of said polymeric matrix as defined by the following formula is not less that 50%:

Bio-carbon degree(%)=(Number of carbon elements derived from biomass/Number of all carbon elements composing polymeric matrix)×100.

2. The member for a rolling bearing according to claim 1, wherein at least a fibrous filler is added to said polymeric matrix.

3. The member for a rolling bearing according to claim 2, wherein said fibrous filler is fiber having an aspect ratio at not less than 5.

4. The member for a rolling bearing according to claim 3, wherein said fiber having said aspect ratio at not less than 5 is glass fiber and/or carbon fiber.

5. The member for a rolling bearing according to claim 1, wherein a surface layer is formed on a part of a surface of said molding obtained by molding said polymeric elastic body or said synthetic resin composition; said part of said surface being exposed to an atmosphere in which said member for said rolling bearing is used; and said surface layer is composed of a material different from that of said polymeric elastic body or that of said synthetic resin composition and has a lower transmission rate than said polymeric elastic body or said synthetic resin composition for an atmospheric component.

6. The member for a rolling bearing according to claim 5, wherein said atmospheric component contains at least one component selected from among oxygen, ozone, and water vapor.

7. The member for a rolling bearing according to claim 5, wherein said surface layer is at least one surface layer selected from among a polymeric compound layer, a ceramic layer, and a metal layer.

8. The member for a rolling bearing according to claim 1, wherein said member for said rolling bearing is the retainer.

9. The member for a rolling bearing according to claim 1, wherein said polymeric matrix contains at least radiocarbon 14 ($^{14}C$).

10. A rolling bearing comprising an inner ring having a rolling surface on a peripheral surface thereof, an outer ring having a rolling surface on an inner peripheral surface, a plurality of rolling elements disposed between said both rolling surfaces, a retainer holding said plurality of said rolling elements, and a sealing member;

wherein at least one member selected from among said inner ring, said outer ring, said rolling elements, said retainer, and said sealing member comprises a molding of a polymeric elastic body or a synthetic resin composition wherein said polymeric elastic body or said synthetic resin composition comprises a polymeric matrix produced by at least partially using raw material derived from a biomass, wherein said polymeric matrix comprises polyamide 66, wherein a bio-carbon degree of said polymeric matrix as defined by the following formula is not less that 50%:

Bio-carbon degree(%)=(Number of carbon elements derived from biomass/Number of all carbon elements composing polymeric matrix)×100.

\* \* \* \* \*